US011943587B2

(12) United States Patent
Shonibare et al.

(10) Patent No.: US 11,943,587 B2
(45) Date of Patent: *Mar. 26, 2024

(54) GENERATING A HEARING ASSISTANCE DEVICE SHELL

(71) Applicant: Starkey Laboratories, Inc., Eden Prairie, MN (US)

(72) Inventors: Olabanji Yussuf Shonibare, Eden Prairie, MN (US); Achintya Kumar Bhowmik, Cupertino, CA (US); David Alan Fabry, Eden Prairie, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/295,022

(22) Filed: Apr. 3, 2023

(65) Prior Publication Data

US 2023/0396937 A1 Dec. 7, 2023

Related U.S. Application Data

(63) Continuation of application No. 17/247,952, filed on Dec. 31, 2020, now Pat. No. 11,622,207.

(60) Provisional application No. 62/955,606, filed on Dec. 31, 2019.

(51) Int. Cl.
*H04R 25/00* (2006.01)

(52) U.S. Cl.
CPC .......... *H04R 25/50* (2013.01); *H04R 25/305* (2013.01); *H04R 25/554* (2013.01); *H04R 2225/55* (2013.01)

(58) Field of Classification Search
None
See application file for complete search history.

(56) References Cited

U.S. PATENT DOCUMENTS

| | | | |
|---|---|---|---|
| 11,622,207 | B2 | 4/2023 | Shonibare et al. |
| 2004/0107080 | A1 | 6/2004 | Deichmann et al. |
| 2006/0233384 | A1 | 10/2006 | Bächler et al. |
| 2008/0089540 | A1 | 4/2008 | Boretzki et al. |

(Continued)

FOREIGN PATENT DOCUMENTS

WO WO-2019104397 A1 6/2019

OTHER PUBLICATIONS

U.S. Appl. No. 17/247,952 U.S. Pat. No. 11,622,207, filed Dec. 31, 2020, Generating a Hearing Assistance Device Shell.

(Continued)

*Primary Examiner* — Harry S Hong
(74) *Attorney, Agent, or Firm* — Schwegman Lundberg Woessner, P.A.

(57) ABSTRACT

Systems and methods may be used to determine a fit for a hearing assistance device shell model. For example, a method may include receiving an image of anatomy of a patient including at least a portion of a canal aperture of an ear of the patient, generating a patient model of a portion of the anatomy of the patient, the patient model indicating at least one of a height or width of the canal aperture, and determining, using the patient model, a best fit model from a set of hearing assistance device shell models generated using a machine learning technique. The method may include outputting an identification of the best fit model.

20 Claims, 9 Drawing Sheets

(56) References Cited

U.S. PATENT DOCUMENTS

| | | | | |
|---|---|---|---|---|
| 2008/0143712 | A1* | 6/2008 | McBagonluri ....... | H04R 25/652 345/420 |
| 2015/0055086 | A1 | 2/2015 | Fonte et al. | |
| 2021/0204076 | A1 | 7/2021 | Shonibare et al. | |

OTHER PUBLICATIONS

"U.S. Appl. No. 17/247,952, Examiner Interview Summary dated Oct. 21, 2022", 2 pgs.
"U.S. Appl. No. 17/247,952, Non Final Office Action dated Aug. 4, 2022", 8 pgs.
"U.S. Appl. No. 17/247,952, Notice of Allowance dated Nov. 28, 2022", 5 pgs.
"U.S. Appl. No. 17/247,952, Response filed Nov. 4, 22 to Non Final Office Action dated Aug. 4, 2022", 9 pgs.
Paulsen, Rasmus, "Statistical Shape Analysis of the Human Ear Canal with Application to In-the-Ear Hearing Aid Design (thesis)", (2004), 217 pgs.

* cited by examiner

GENERATING A HEARING ASSISTANCE DEVICE SHELL

CLAIM OF PRIORITY

This application is a continuation of U.S. patent Application Ser. No. 17/247,952, filed Dec. 31, 2020, now issued as U.S. Pat. No. 11,622,207, which claims the benefit of priority to U.S. Provisional Application No. 62/955,606, filed Dec. 31, 2019, titled "GENERATING A HEARING ASSISTANCE DEVICE SHELL", each of which are hereby incorporated herein by reference in their entirety.

BACKGROUND

Hearing devices provide sound for the wearer. Examples of hearing devices include headsets, hearing assistance devices, speakers, cochlear implants, bone conduction devices, and personal listening devices. Hearing assistance devices provide amplification to compensate for hearing loss by transmitting amplified sounds to their ear canals. In various examples, a hearing assistance devices is worn in or around a patient's ear. Hearing assistance devices have a shell that protects interior components and is shaped to be comfortable for a user.

DETAILED DESCRIPTION

Systems and methods described herein may be used to generate one or more models for use in a hearing assistance device, for example to be used as a shell for the hearing assistance device. The one or more models may be generated such that they may be used as semi-customized hearing assistance device shells (e.g., such that most users (e.g., 90-95%) are able to use one of the one or more models without discomfort). The one or more models may be specific to a type of hearing assistance device, for example in-the-ear (ITE), in-the-canal (ITC), completely-in-the-canal (CIC), invisible-in-the-canal (IIC), or the like.

A database or library of 3D hearing aid shells may include custom shells generated for users, for example based on images of users, molds, etc. The database may include corresponding information, such as fit, comfort, or other user information (e.g., age, preferences, etc.). Using the database, the systems and methods described herein may determine a set of prototype shells using a machine learning technique, with shells in the set designed to fit a large population of users.

Current procedures to fit a patient with a hearing device are long and complex. For example, a test may be conducted to determine the degree of hearing loss for an individual. An ear impression may be taken. In addition to the specifications of the hearing assistance device, a physical mold may also be sent to a manufacturer for a custom hearing assistance device request. At the manufacturing office, the ear impression may be digitized and further processed into a hearing shell that will fit into the patient's ear. The required electronic parts to address the earlier diagnosed hearing loss may then be installed. The manufacturer then sends the final device to an audiologist who subsequently meets with the patient to complete the final program modifications using the physical hearing assistance device. This whole process takes an average of three weeks or longer.

The techniques described herein may be used to eliminate some of these steps such that the time it takes to fit a patient with a hearing device may be an hour or less. Previous efforts to attain this kind of fit have centered around the notion of building the external region of the hearing assistance device that goes into the auditory canal for a snug fit. This lack of variability prevents the device from going deep in the canal.

Figure 1:
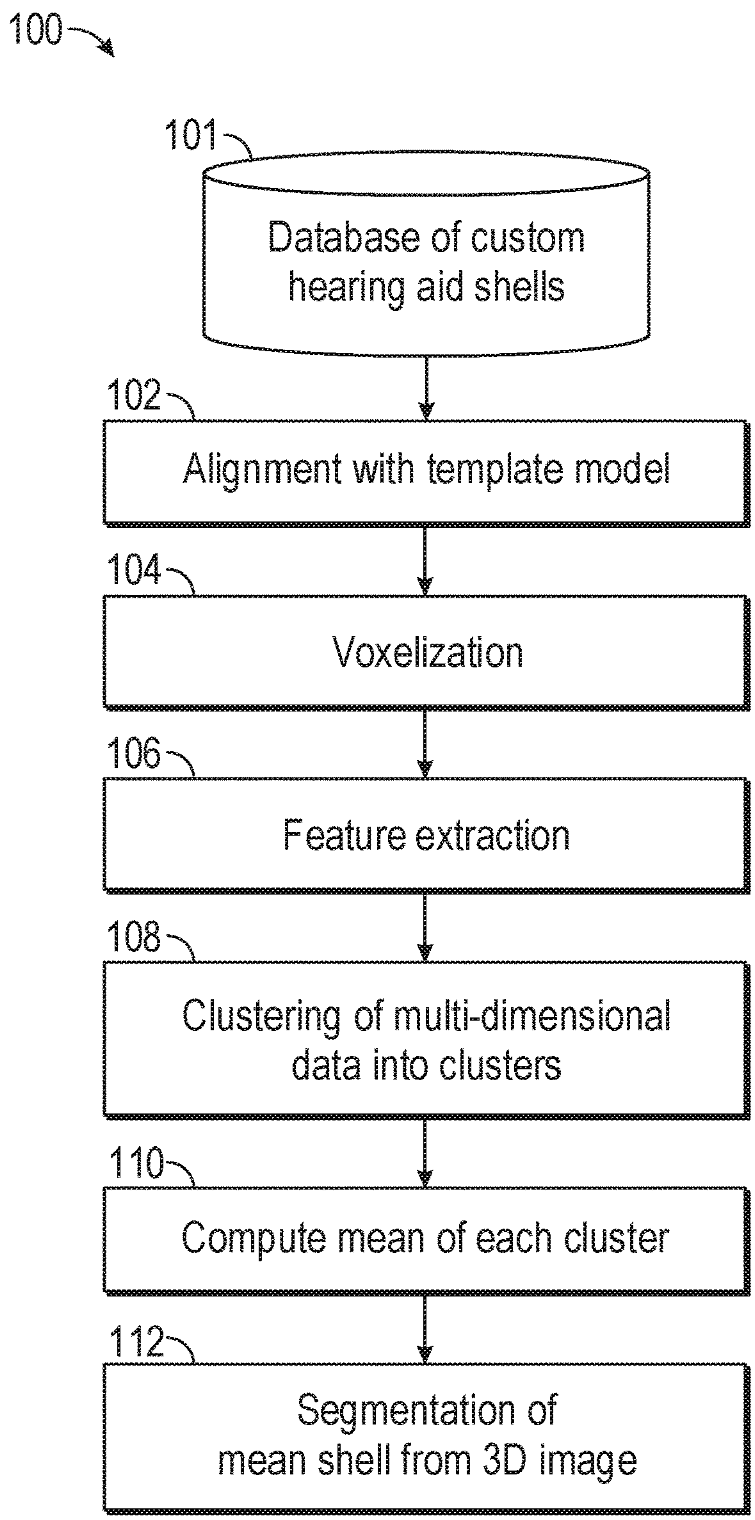
FIG. 1 illustrates a flow diagram for generating one or more models for hearing assistance device shells according to an example.

The techniques described herein may be used to learn a particular number of 3D shells in a set (e.g., 2, 5, 7, 10, 20, etc.) from a repository of custom-made shells such that a patient may choose one that fits them. Once the set of shells is determined, the shells may be mass produced to lower costs and provide an optimized hearing assistance device design. In an example, an individual may determine a best fit of the set of shells without professional help, for example by taking pictures of the individual's ear, and optionally selecting a shell using an online interface, FIG. 1 illustrates a flow diagram 100 for generating one or more models for hearing assistance device shells according to an example. The flow diagram 100 includes a database 101, which may store a plurality of custom hearing aid shells (e.g., specifications for generating, printing, or manufacturing shells). The information stored in the database 101 about the shells may include one or more of measurement data, patient comfort or fit data, information about whether a particular shell was returned by a patient, shell type (e.g., for use with an ITE, an ITC, a CIC, an IIC, or other hearing assistance device) or the like.

The shells may be generated for saving in the database 101 by obtaining a silicone impression of the auditory canal of a patient. These impressions may be stored in a computer or the database 101 using a 3D laser scanning system. The digitized ear impression is further processed with a 3D CAD software to produce a hearing aid housing. Such hearing aids include in-the-ear hearing aids, in-the-canal hearing aids, completely-in-the-canal hearing aids and invisible-in-the-canal hearing aids. Operations conducted using components 102-112 are explained in more detail below.

The database 101 may be accessed to retrieve shell information. In an example, for training a machine learning model, shell information may be accessed from the database 101 and aligned with a template model at component 102.

Once aligned, a shell may be voxelized (e.g., broken down into voxels, or 3D boxes) to represent the shape of the shell at component 104. At component 106, features of the shell (represented with voxels) may be extracted. At component 108, the plurality of shells (or a subset) may be clustered. Component 108 may be used to cluster multi-dimensional data from component 106 into k-clusters (e.g., 4, 8, 12, etc.). Component 110 may be used to compute a "mean" of each cluster, for example an average or median shell representing the cluster. The "mean" shells of each cluster may be segmented from a 3D image to generate a final set of shells.

Once complete, a "mean" shell may be sent to a 3D printer, stored on a central server, for example at a fabrication site for retrieval at a later time, or stored in the database 101.

Figure 2:
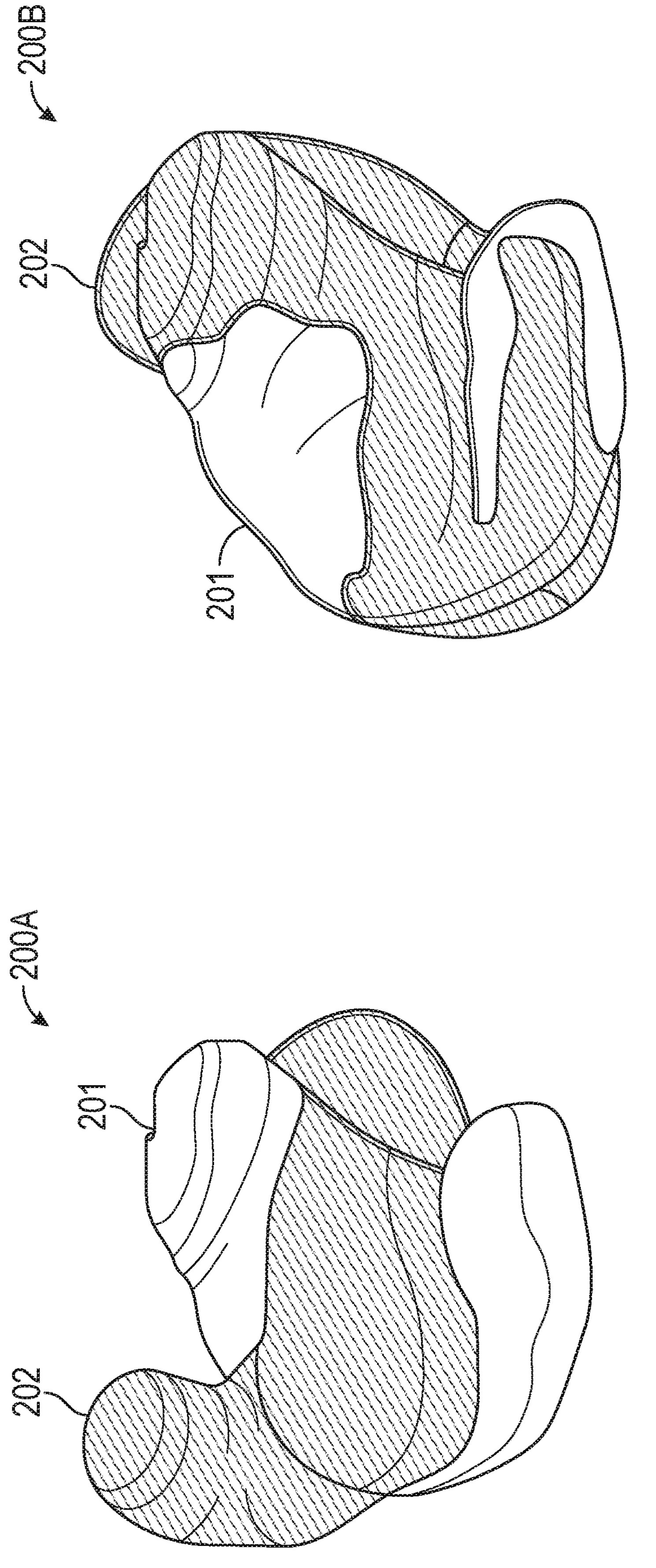
FIG. 2 illustrates alignment of a shell model to a template according to an example.

FIG. 2 illustrates alignment of a shell model 202 to a template 201 according to an example. The shell model 202 and the template 201 are shown in a first position 200A before alignment of the shell model 202 to the template 201 and a second position 200B after alignment of the shell model 202 to the template 201. Alignment of a shell model to the template 201 may be performed for a plurality of shell models. In an example, each model obtained from laser scanning may be initially stored with an arbitrary coordinate system, since each is captured from a different viewpoint. These models may then be aligned to the template 201 (e.g., each obtained model is aligned to a same template).

In an example, the template 201 may be representative of a class of hearing assistance device. For a particular class of hearing assistance device, a spatial transformation may be found to align each shell with the template 201, which may be representative of that class.

The registration may result in transformation of all 3D shells (e.g., of a particular style) into a same coordinate system (e.g., that of the template 201) such that poses of the 3D shells may be estimated within the same coordinate system. The registration of these models described herein may be model-based, point-based, or feature-based.

In an example, the registration of a template model (target), and source model, may be achieved as follows. Suppose the target and source model are composed of the points, $Y=\{\gamma_1, \gamma_2, \gamma_3, \ldots, \gamma_n\}$, $X=\{x_1, x_2, x_3, \ldots, x_n\}$, in $R^3$ respectively. The parameters of a transformation T may be generated such that when applied to the source points, a best alignment of the target and source model is obtained.

To estimate the pose or alignment, the correspondence between the source and the target points may be assumed. Let $\zeta$ denote the correspondence between the two point sets so that point i in the target model is mapped to point $\zeta(i)$ in the source model. In most practical applications, some source points have no correspondence with any target points. An example approach to handle such situation is to assign weights to the source points so that points with no correspondence have a weight of zero and the weights for points with correspondence are set to one. Thus, the following error function in Eq. 1 may be minimized to align points:

$$E(\theta, \zeta) = \sum_{i=1}^{m} w_i \epsilon^2(|y_{\zeta(i)} - T(x_i, \theta)|) \qquad \text{Eq. 1}$$

where $x_i$ and $y_{\zeta(i)}$ are corresponding points, $w_i$ is the weights and E is a distance function.

In an example, the point-wise correspondences between the two point clouds in the target and source model are unknown. In this scenario, the alignment and correspondence between the two point sets may be solved simultaneously or alternatingly. An example approach for solving this problem is an Expectation-Maximization (EM) type algorithm. In an example, an initial guess may be used and then an iterative solution for the correspondence and estimation in an alternating fashion may be used.

In an example, the transformation T is rigid and includes only translation and rotation. An example of an algorithm that performs rigid registration is the iterative closest point (ICP) algorithm. In this example, the ICP may be executed in two iterative steps, as described below.

Starting with an initial guess for the parameters of T, $\alpha_0$, the correspondence between the two point sets may be computed as shown in Eq. 2:

$$\zeta(i) = \arg\min_j \epsilon^2[|y_j - T(x_k, \theta_i)|];\ i = 1, 2, \ldots, m \qquad \text{Eq. 2}$$

Next, the parameters of T may be updated as shown in Eq. 3:

$$\theta_{k+1} = \underset{\theta}{\operatorname{argmin}} \sum_{i=1}^{m} \epsilon^2[|y_{\zeta(i)} - T(x_i, \theta)|] \qquad \text{Eq. 3}$$

These two steps may be repeated until the error function falls below a specified threshold. Other examples of algorithms that may be used for registration include but are not limited to Levenberg-Marquardt algorithm (LAI-ICP), robust point matching, coherent point drift, modal and spectral matching, or PCA alignment.

FIG. 2 demonstrates the registration of an in-the-ear housing shell 202 with a template model 201, but other example templates may be used. 200A shows the initial position before registration while 200B is the result after the registration process is completed.

Figure 3:
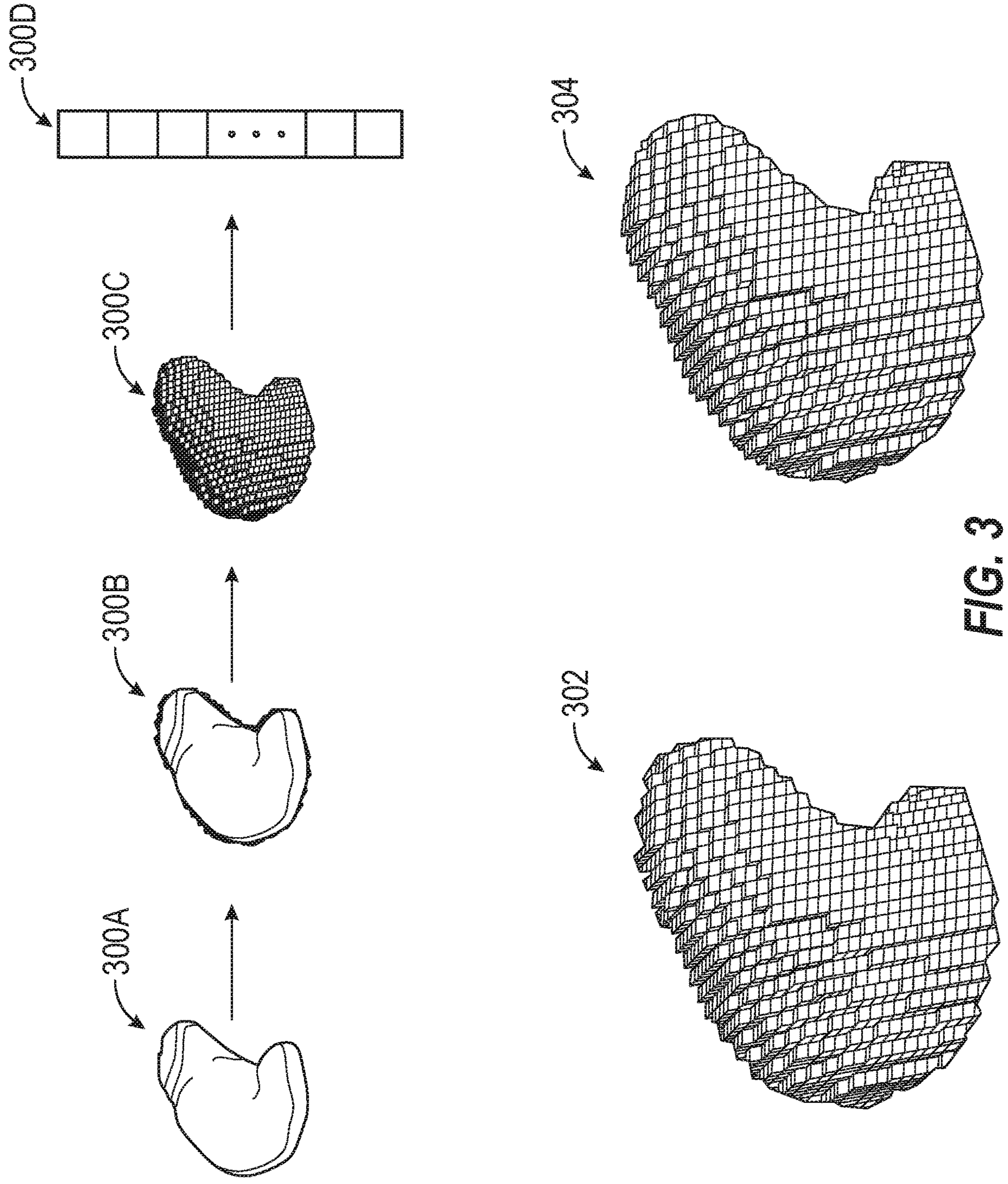
FIG. 3 illustrates feature extraction of a model to generate a feature vector according to an example.

FIG. 3 illustrates feature extraction of a model to generate a feature vector according to an example. The model is shown in various stages, including before feature extraction at 300A, at a coarse level of voxelization at 300B and 302, a fine level of voxelization at 300C and 304, and represented as a feature vector at 300D.

Following the registration of each model to a canonical coordinate frame, voxelization may be performed. In a voxelization operation, each 3D model may be represented as a polygonal mesh that is approximated with a set of voxels (e.g., cubes). In an example, to voxelize a model, first the bounding cube of the 3D model is obtained. This bounding cube is then uniformly subdivided in the three coordinate axis, after which the fraction of the polygonal mesh surface inside each cube is estimated, A voxel is assigned a value of 1 if it overlaps with a surface of the mesh, otherwise it is set to zero. Thus, each object may be represented as a binary function as shown in Eq. 4:

$$u(x) = \begin{cases} 1, & x \in \Omega \\ 0, & x \notin \Omega \end{cases} \qquad \text{Eq. 4}$$

where $\Omega$ represents the domain of each object,

FIG. 3 shows two coarse examples at 300B and 302, and two fine examples at 300C and 304 for voxelization of an example shell 300A. Using a voxel grid may achieve a more robust handling of the variances of the polygonal surface (e.g., the 3D model). The information stored in each voxel may be further processed to obtain a more compact descriptor of the 3D model represented as a feature vector at 300D.

In an example, a 3D Discrete Fourier Transform is applied to the voxel model (e.g., a fine model 300C or 304) to obtain the spectral domain feature vector at 300D.

In addition to being invariant to translation, rotation, scaling and reflection, it may be useful for the feature vector chosen to be insensitive to noise, and robust against random topological degeneracies. Other suitable descriptors that may be employed here include 3D voxel-based spherical harmonic, 3D ray-based spherical harmonics, PCA-spherical harmonics transform, probability density-based shape descriptors, or 3D Hough transform descriptor.

Figure 4:
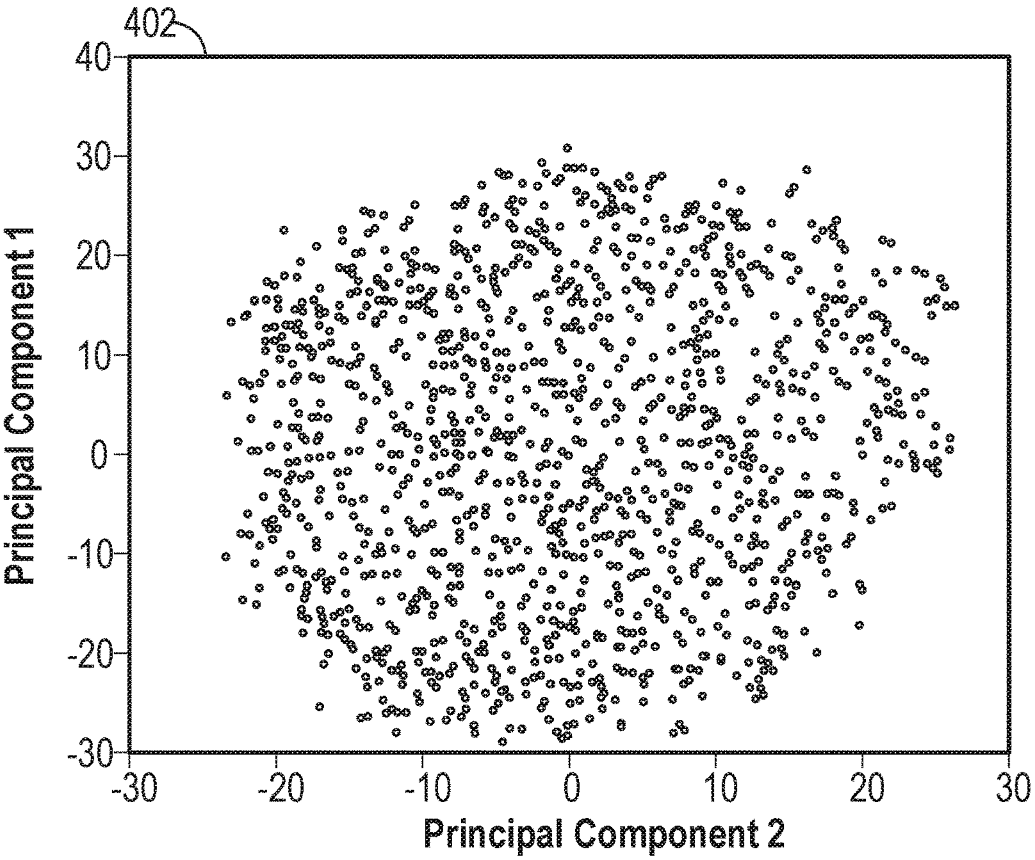
FIG. 4 illustrates sets of feature vectors according to an example.
Figure 4:
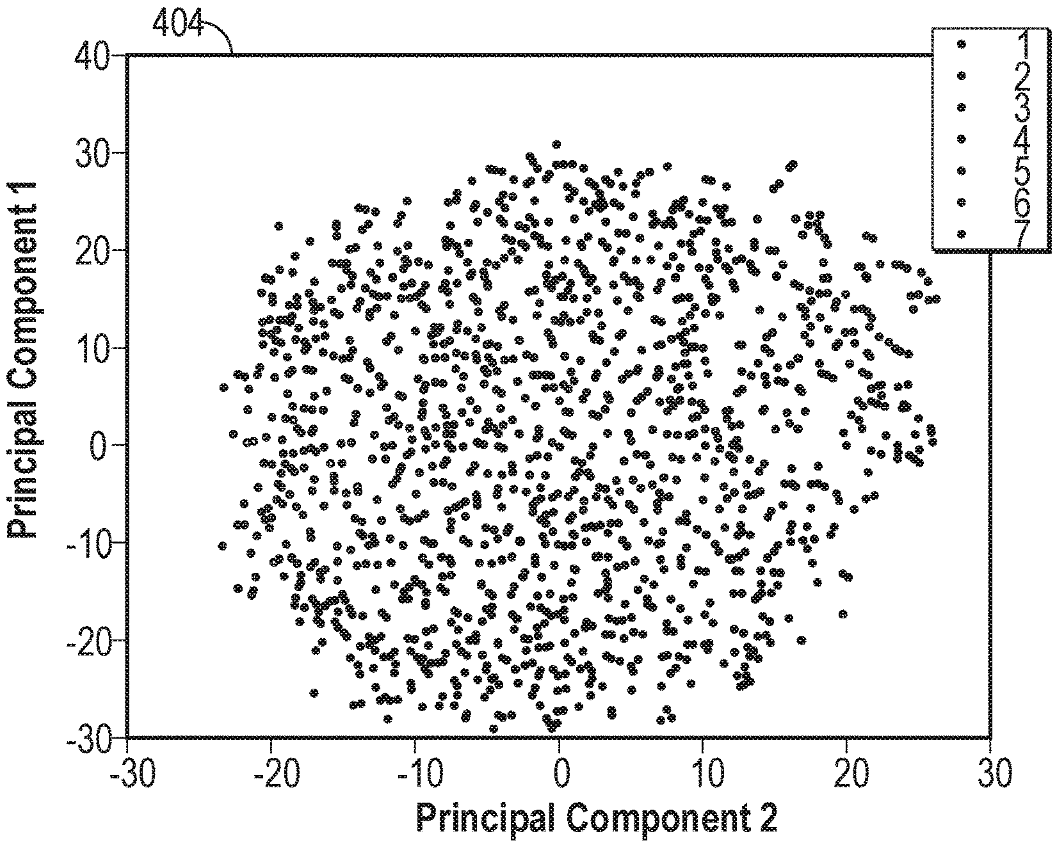

FIG. 4 illustrates sets of feature vectors according to an example. For example, FIG. 4 includes a full set of feature vectors represented in graph 402, and clustered sets of feature vectors represented in graph 404. In an example, each dot on graph 402 or 404 may represent a feature vector of a 3D model.

The feature vectors of 3D models (e.g., from 300D) may be partitioned into k clusters. The determination of the number of clusters may be guided by the shape and scale parameters of the point distribution or the target application. When the number of inherent clusters in the dataset is not apparent, then the number may be estimated.

A metric used to compare results for different values of K may include an average distance between data points in a cluster and its centroid. Since increasing K ultimately reduces this metric to zero, which corresponds to when K equals the number of data points, this metric may not be sufficient. The selection process may further include an elbow method, an information criterion approach, a silhouette method, cross-validation, or analysis of a kernel matrix.

A k-means clustering algorithm may be used. In an example, given feature vectors $x^{(1)}, x^{(2)}, \ldots, x^{(m)} \in R^n$, k centroids may be predicted and for each training data, a label $c^{(i)}$ may be predicted. The algorithm may include:

1. Randomly initialize cluster centroids $\mu_1, \mu_2, \ldots, \mu_k \in R^n$
2. While not converged:

$$\text{For every } i\text{, set } c^{(i)} := \arg\min_j \|x^{(i)} - \mu_j\|^2 \qquad \text{Eq. 5}$$

$$\text{For every } j\text{, set } \mu_j := \frac{\sum_{i=1}^{m} 1\{c^{(i)} = j\} x^{(i)}}{\sum_{i=1}^{m} 1\{c^{(i)} = j\}}$$

A number of alternative clustering algorithms may be employed, such as density-based clustering methods, spectral clustering, soft clustering with Gaussian mixtures, a neural network such as a generative adversarial network (GAN) for a distribution that results in multiple shells, a serial auto-encoder, or the like. For any positive M, the three-dimensional Discrete Fourier Transform of a 3D array, $u_n$, is an invertible linear transformation, $F: \mathbb{C}^{N\times N\times N} \rightarrow \mathbb{C}^{N\times N\times N}$, defined by:

$$U_k = \sum_{n=0}^{M-1} u_n e^{-2\pi i k \cdot \left(\frac{n}{M}\right)} \qquad \text{Eq. 6}$$

Where $$M - 1 = (M_1 - 1, M_2 - 1, M_3 - 1),$$

$$\frac{n}{M} = \left(\frac{n_1}{M_1}, \frac{n_2}{M_2}, \frac{n_3}{M_3}\right), k = (k_1, k_2, k_3), n = (n_1, n_2, n_3)$$

and the summation is over all 3-tuples from 0 to M−1. The inverse transform may be defined as:

$$u_n = \frac{1}{M_1 M_2 M_3} \sum_{k=0}^{M-1} U_k e^{2\pi i n \cdot \left(\frac{k}{M}\right)} \qquad \text{Eq. 7}$$

where $k/M=(k_1/M_1, k_2/M_2, k_3/M_3)$. From the analysis above and assuming a voxel grid of dimension $M^3$, the matrix of Fourier coefficients, F, for all N objects may be constructed. The final shape of F may be $2M^3 \times N$ because of the expansion of the complex coefficients into its real and imaginary counterparts.

An example output of this process may include the clustered graph 404, values corresponding to mean points (e.g., a mean or average shell model) of the clustered graph 404, a feature vector corresponding to each cluster of the clustered graph 404 (e.g., of a centroid of a cluster) or the like. The output may be used to generate a set of shells.

Figure 5:
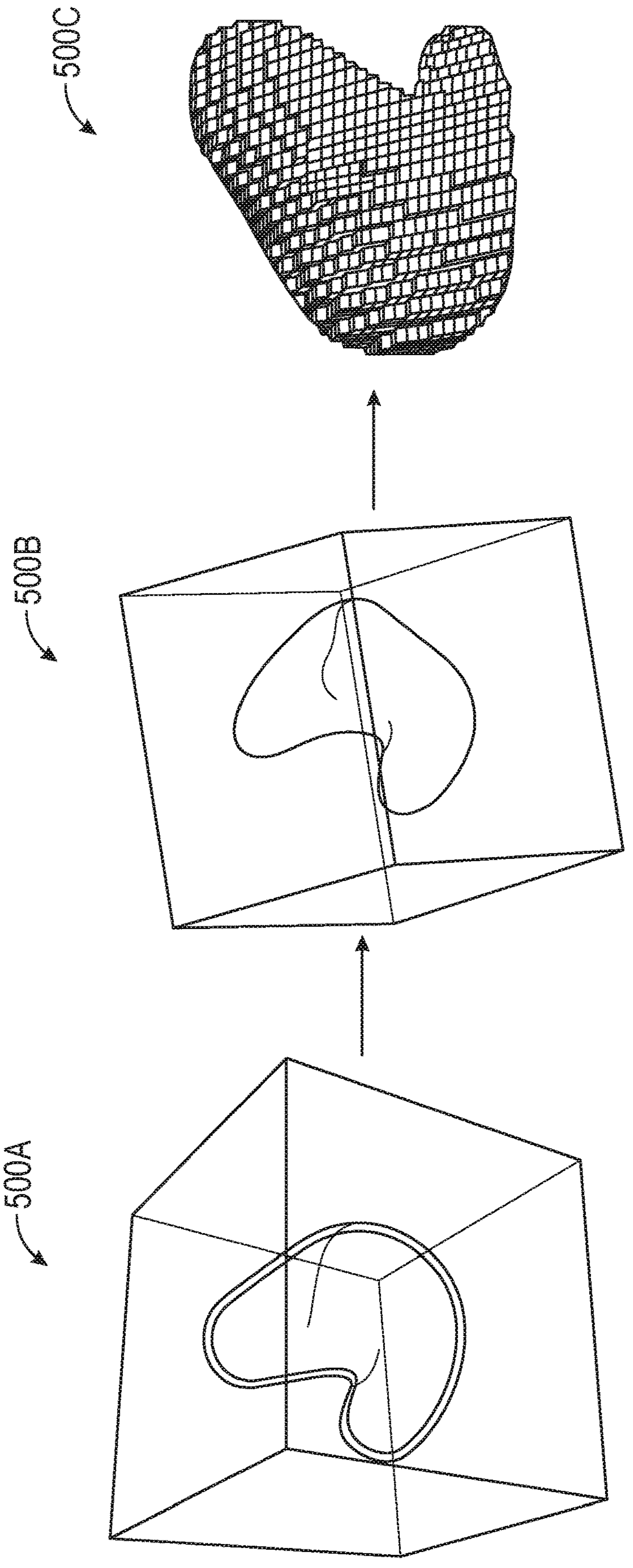
FIG. 5 illustrates an example 3D shell model output according to an example.

FIG. 5 illustrates an example 3D shell model output according to an example. The mean shape within each cluster (e.g., clusters of graph 404) may be estimated by computing the average, $\overline{F}$, of the coefficients components-wise, for example using a formula such as Eq. 8:

$$\overline{F} = \frac{1}{N} \sum_{j=1}^{N} F^{(j)}, \qquad \text{Eq. 8}$$

where $F^{(j)}$ is the jth column of F.

In FIG. 5, 500A shows the final result after calculating the inverse transform of the mean of coefficients for objects in a cluster: The final output, in an example, may be a mirror image or inverted from an original model (e.g., as shown in FIG. 3 at 300A). As shown in FIG. 5 at 500A, the final output may not be a binary function. To rectify this, the following minimization problem may be solved, for example based on a Modica-Mortola energy:

$$\min_u \left[ \int_\Omega \epsilon |\nabla u|^2 + \frac{1}{\epsilon} u^2 (1-u)^2 dx + \frac{\lambda}{2} \|u - u_o\|^2 \right] \qquad \text{Eq. 9}$$

In other words, given an object function $u_o$, an optimal approximation u of $u_o$ and a decomposition $\Omega_j$ of $\Omega$ may be determined, such that inside each the variation of u is smooth but discontinuous across element boundaries. In an example, where $\Gamma=\{x|u(x)=0.5\}$ represents the shape boundary at the 0.5 level set of u, a binary representation may be obtained by setting the value of u to 1 inside Γ and 0, outside. This procedure is shown in FIG. 5 where 500B and 500C show a transition state (500B) and a final state (500C). The final state 500C is not inverted, and corresponds to the original model (e.g., 300A of FIG. 3). The final state 500C may be the result after binarization.

Figure 6:
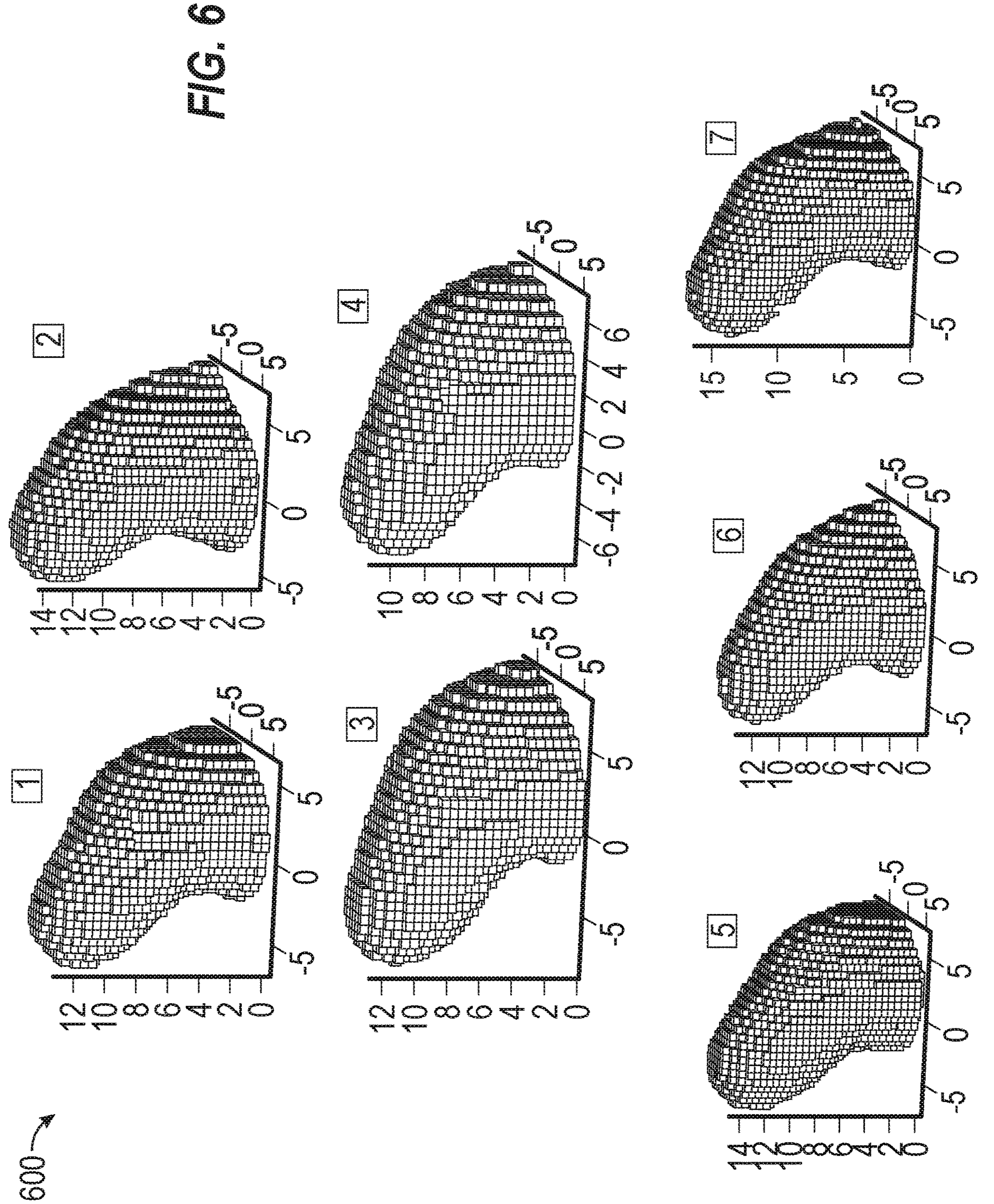
FIG. 6 illustrates a set of 3D shell models according to an example.

FIG. 6 illustrates a set 600 of 3D shell models according to an example. The set of models 600 are labeled 1-7, but may include any number of models, such as corresponding to a number of clusters in graph 404 of FIG. 4 (e.g., 2, 3, 5, 10, 20, etc.).

In an example, the set of 3D shell models 600 may be used as generic shells for users, such that the models in the set 600 cover a portion of the population within a tolerance. For example, the models in the set may cover 90-95% of the population within a fit tolerance. The tolerance may include a physical tolerance, such as height, width of canal aperture, width of concha bowl, canal aperture height or width, hardness, durability, or the like. In another example, the tolerance may include a comfort tolerance level (e.g., users do not complain about the fit, users only experience a certain amount of discomfort, no pain is present, or the like).

A best fit shell from the set of models 600 may be used for a user. For example, a user may test shells by insertion of physical representations of the models to test for fit. In another example, an image of the user's ear anatomy may be generated (e.g., using a smart phone), from which a model may be generated of the user's ear. The model may be aligned (e.g., as described above), and compared using for example a best fit algorithm or minimum distance algorithm (or via a machine learning technique) to compare to each model of the set of models 600. The best fit or minimum distance model of the set 600 may be identified for the user. The selected model from the set 600 may be physically generated as a shell, which may be used by the user as part of a hearing assistance device. The physical shell ay be generated before the testing (e.g., a number of physical shells of each of the models in the set 600 may be on hand), and given to the user without needing to wait for manufacturing.

Figure 7:
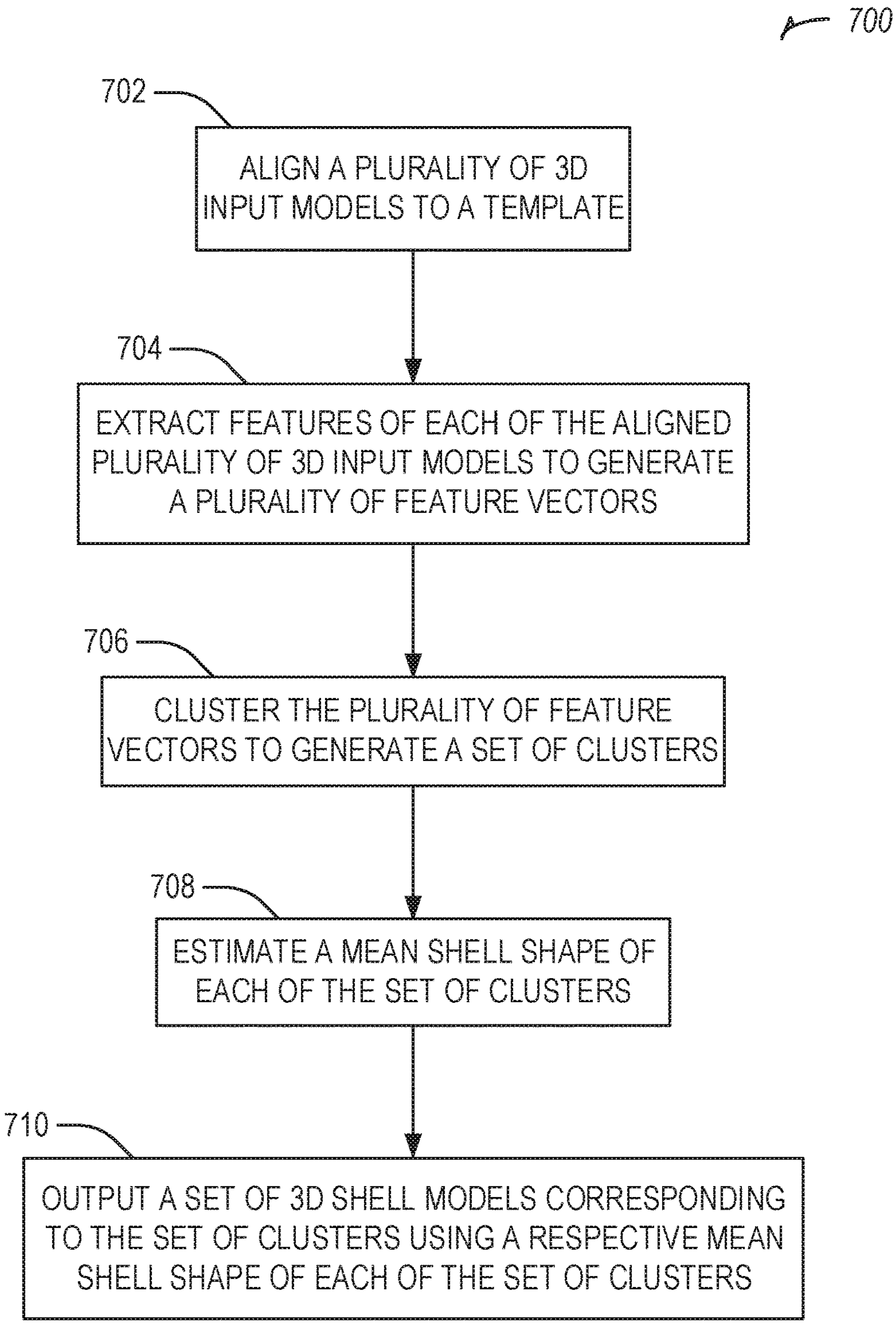
FIG. 7 illustrates a flowchart showing a technique for generating a set of 3D shell models of a hearing assistance device according to an example.

FIG. 7 illustrates a flowchart showing a technique 700 for generating a set of 3D shell models of a hearing assistance device according to an example.

The technique 700 includes an operation 702 to align a plurality of 3D input models to a template. The plurality of 3D input models may be generated from images based on patient anatomy. For example, the images may include two orthogonal images (e.g., images taken from vantage vectors substantially 90 degrees apart). The two orthogonal images may be generated by a mobile device, for example a phone. In an example, the images may be generated from a mold (e.g., silicone) of patient anatomy, for example by scanning the mold or taking one or more pictures of the mold.

In an example, operation 702 may include aligning and determining correspondence between respective points in a model of the plurality of 3D input models and points in the template. The aligning and correspondence may be performed together, for example simultaneously, alternating, or the like. The alignment may be performed iteratively using, for example, an expectation-maximization algorithm. In an example, aligning the models to the template may include only translation or rotation (e.g., a rigid alignment, without skewing, deleting points, or otherwise modifying the outline or shape of the models).

The technique 700 includes an operation 704 to extract features of each of the aligned plurality of 3D input models to generate a plurality of feature vectors corresponding to the aligned plurality of 3D input models. Operation 704 may include converting the plurality of 3D input models into voxels. The feature vectors may be generated using a 3D Discrete Fourier Transform (DFT) applied to the voxels, in an example. Extracting filters may include using a low pass filter as described above.

The technique 700 includes an operation 706 to cluster the plurality of feature vectors to generate a set of clusters. Clustering may include using one or more of: k-means clustering, density-based clustering, spectral clustering, modeling with Gaussian mixtures, or the like.

The technique 700 includes an operation 708 to estimate a mean shell shape of each of the set of clusters. Operation 708 may include by determining a component-wise average of Fourier coefficients of a matrix comprising a linear transformation of the feature vectors of a particular cluster. Other estimation techniques may be used to determine an average (mean), or median shell, of a particular cluster.

The technique 700 includes an operation 710 to output a set of 3D shell models corresponding to the set of clusters using a respective mean shell shape of each of the set of clusters. In an example, before outputting the set of 3D shell models, the technique 700 may include inverting the respective mean shell shapes of each of the set of clusters, for example by solving a minimization problem to generate the set of 3D shell models. The minimization problem may use a Mordica-Mortola energy functional, in an example.

In an example, the set of 3D shell models may be used as generic shells for users, such that the models in the set cover a portion of the population within a tolerance. For example, the models in the set may cover 90-95% of the population within a fit tolerance. The tolerance may include a physical tolerance, such as height, width of canal aperture, width of concha bowl, canal aperture height or width, hardness, durability, or the like. In another example, the tolerance may include a comfort tolerance level (e.g., users do not complain about the fit, users only experience a certain amount of discomfort, or the like).

Physical shells may be generated from the set of 3D shell models, in an example. A user may test a fit using the physical shells.

In an example, one or more images of a user may be captured (e.g., two orthogonal images, images of a mold, etc.). The one or more images of the user may be used to generate a model (e.g., a computer 3D rendering). The model may be aligned, such as to the template or to one or more of the set of 3D shell models that were output in operation 710. Once aligned (and optionally point correspondence is performed), one of the set of 3D shell models may be selected for the user. The selection may be based on a best fit of the aligned model to the models in the set, a machine learning technique may be applied to find a best model in the set when compared to the aligned model, a distance function from the aligned model to each of the models in the set may be performed, or the like. The selected model from the set may be physically generated as a shell, which may be used by the user as part of a hearing assistance device.

Figure 8:
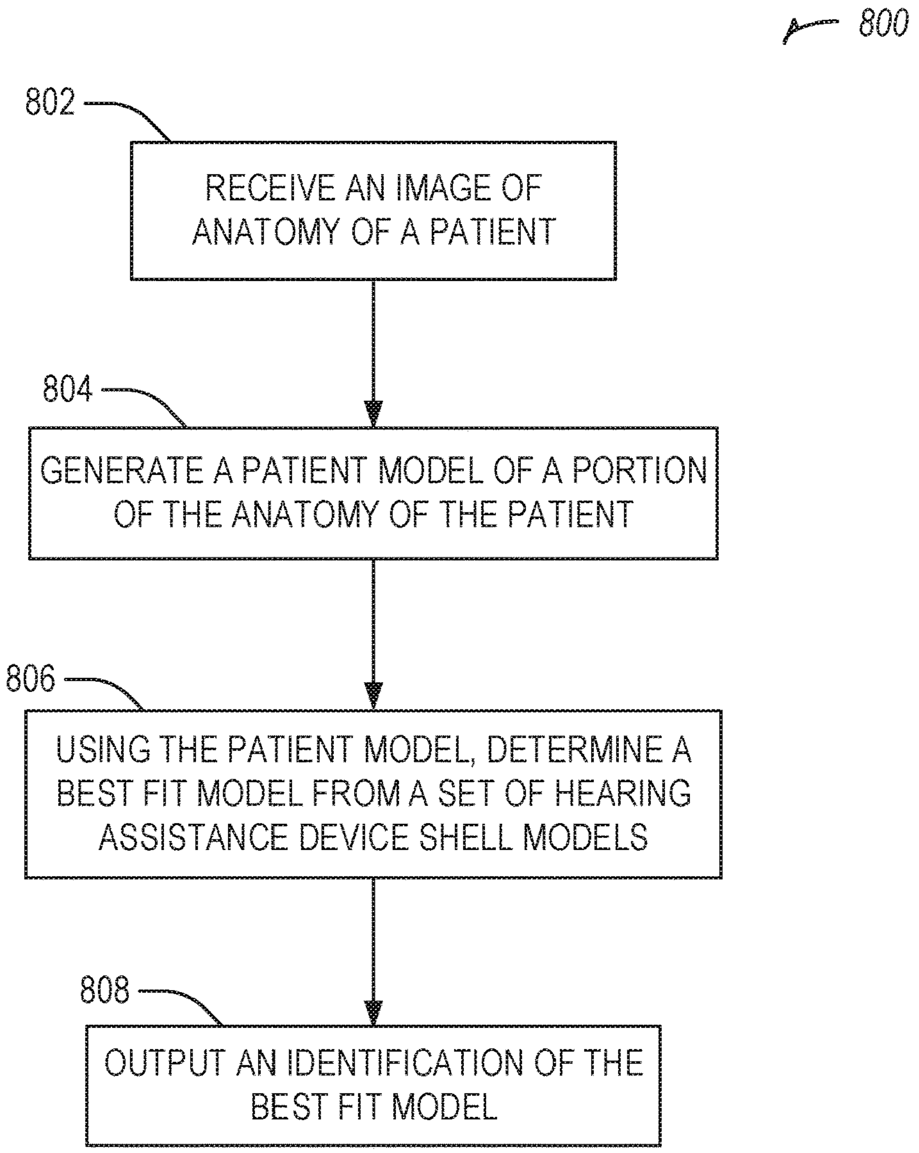
FIG. 8 illustrates a flowchart showing a technique for fitting a model to a patient according to an example.

FIG. 8 illustrates a flowchart showing a technique 800 for fitting a model to a patient according to an example. The technique 800 includes an operation 802 to receive an image of anatomy of a patient, for example including at least a portion of a canal aperture of an ear of the patient. The image may be of a mold taken of the anatomy of the patient. In an example, the image includes two orthogonal images generated by a mobile device.

The technique 800 includes an operation 804 to generate a patient model of a portion of the anatomy of the patient. The patient model may indicate at least one of a height or width of the canal aperture. In another example, the patient model may indicate at least one of a height or width of a concha bowl of the ear of the patient. The technique 800 includes an operation 806 to determine, using the patient model, a best fit model from a set of hearing assistance device shell models, which may be generated using a machine learning technique as described herein.

In an example, the set of models may be generated by clustering a plurality of feature vectors corresponding to a plurality of 3D input models to generate a set of clusters, and estimating a mean shell shape of each of the set of clusters. The plurality of feature vectors may be generated by aligning the plurality of 3D input models to a template, and extracting features of each of the aligned plurality of 3D input models to generate the plurality of feature vectors corresponding to the aligned plurality of 3D input models. In an example, aligning the plurality of 3D input models to the template includes determining correspondence between respective points in a model of the plurality of 3D input models and points in the template. Extracting features of each of the aligned plurality of input models may include converting the plurality of 3D input models into voxels. In an example, clustering the plurality of feature vectors includes using at least one of: k-means clustering, density-based clustering, spectral clustering, or modeling with Gaussian mixtures. In another example, the set of hearing assistance device shell models are output after inverting the respective mean shell shapes of each of the set of clusters by solving a minimization problem. The technique 800 includes an operation 808 to output an identification of the best fit model.

Figure 9:
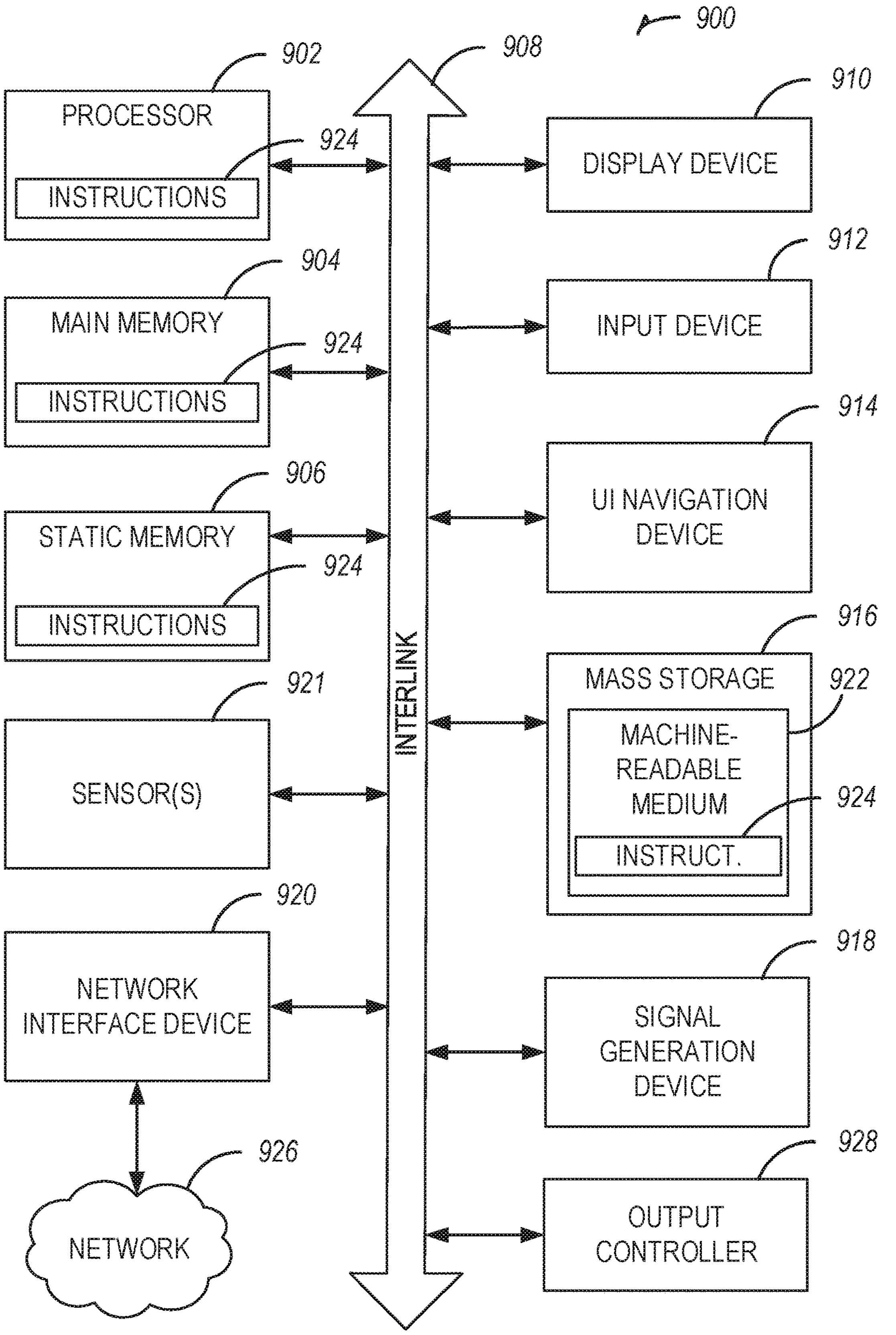
FIG. 9 illustrates generally an example of a block diagram of a machine upon which any one or more of the techniques discussed herein may be performed according to an example.

FIG. 9 illustrates generally an example of a block diagram of a machine 900 upon which any one or more of the techniques (e.g., methodologies) discussed herein may perform according to an example. In alternative embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environment. The machine 900 may be a hearing assistance device, a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 900 may include a hardware processor 902 (e.g., a central processing unit (CPU), a graphics processing unit (GPU), a hardware processor core, or any combination thereof), a main memory 904 and a static memory 906, some or all of which may communicate with each other via an interlink (e.g., bus) 908. The machine 900 may further include a display unit 910, an alphanumeric input device 912 (e.g., a keyboard), and a user interface (UI) navigation device 914 (e.g., a mouse). In an example, the display unit 910, alphanumeric input device 912 and UI navigation device 914 may be a touch screen display. The machine 900 may additionally include a storage device (e.g., drive unit) 916, a signal generation device 918 (e.g., a speaker), a network interface device 920, and one or more sensors 921, such as a global positioning system (GPS) sensor, compass, accelerometer, or other sensor. The machine 900 may include an output controller 928, such as a serial (e.g., universal serial bus (USB), parallel, or other wired or wireless (e.g., infrared (IR), near field communication (NEC), etc.) connection to communicate or control one or more peripheral devices (e.g., a printer, card reader, etc.).

The storage device 916 may include a machine readable medium 922 that is non-transitory on which is stored one or more sets of data structures or instructions 924 (e.g., software) embodying or utilized by any one or more of the techniques or functions described herein. The instructions 924 may also reside, completely or at least partially, within the main memory 904, within static memory 906, or within the hardware processor 902 during execution thereof by the machine 900. In an example, one or any combination of the hardware processor 902, the main memory 904, the static memory 906, or the storage device 916 may constitute machine readable media.

While the machine readable medium 922 is illustrated as a single medium, the term "machine readable medium" may include a single medium or multiple media (e.g., a centralized or distributed database, and/or associated caches and servers) configured to store the one or more instructions 924.

The term "machine readable medium" may include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: nonvolatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 924 may further be transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IFEE) 802.11 family of standards known as Wi-Fi®, IEEE 802.16 family of standards known as WiMax®), IEEE 802.15.4 family of standards, peer-to-peer (P2P) networks, among others. In an example, the network interface device 920 may include one or more physical jacks (e.g., Ethernet, coaxial, or phone jacks) or one or more antennas to connect to the communications network 926. In an example, the network interface device 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 900, and includes digital or analog communications signals or other intangible medium to facilitate communication of such software.

Hearing assistance devices typically include at least one enclosure or housing, a microphone, hearing assistance device electronics including processing electronics, and a speaker or "receiver." Hearing assistance devices may include a power source, such as a battery. In various embodiments, the battery may be rechargeable. In various embodiments multiple energy sources may be employed. It is understood that in various embodiments the microphone is optional. It is understood that in various embodiments the receiver is optional. It is understood that variations in communications protocols, antenna configurations, and combinations of components may be employed without departing from the scope of the present subject matter. Antenna configurations may vary and may be included within an enclosure for the electronics or be external to an enclosure for the electronics. Thus, the examples set forth herein are intended to be demonstrative and not a limiting or exhaustive depiction of variations.

It is understood that digital hearing assistance devices include a processor. In digital hearing assistance devices with a processor, programmable gains may be employed to adjust the hearing assistance device output to a wearer's particular hearing impairment. The processor may be a digital signal processor (DSP), microprocessor, microcontroller, other digital logic, or combinations thereof. The processing may be done by a single processor, or may be distributed over different devices. The processing of signals referenced in this application may be performed using the processor or over different devices. Processing may be done in the digital domain, the analog domain, or combinations thereof. Processing may be done using subband processing techniques. Processing may be done using frequency domain or time domain approaches. Some processing may involve both frequency and time domain aspects. For brevity, in some examples drawings may omit certain blocks that perform frequency synthesis, frequency analysis, analog-to-digital conversion, digital-to-analog conversion, amplification, buffering, and certain types of filtering and processing. In various embodiments the processor is adapted to perform instructions stored in one or more memories, which may or may not be explicitly shown. Various types of memory may be used, including volatile and nonvolatile forms of memory. In various embodiments, the processor or other processing devices execute instructions to perform a number of signal processing tasks. Such embodiments may include analog components in communication with the processor to perform signal processing tasks, such as sound reception by a microphone, or playing of sound using a receiver (i.e., in applications where such transducers are used). In various embodiments, different realizations of the block diagrams, circuits, and processes set forth herein may be created by one of skill in the art without departing from the scope of the present subject matter.

Various embodiments of the present subject matter support wireless communications with a hearing assistance device. In various embodiments the wireless communications may include standard or nonstandard communications. Some examples of standard wireless communications include, but not limited to, Bluetooth™, low energy Bluetooth, IEEE 802.11 (wireless LANs), 802.15 (WPANs), and 802.16 (WiMAX). Cellular communications may include, but not limited to, CDMA, GSM, ZigBee, and ultra-wideband (UWB) technologies. In various embodiments, the communications are radio frequency communications. In various embodiments the communications are optical communications, such as infrared communications. In various embodiments, the communications are inductive communications. In various embodiments, the communications are ultrasound communications. Although embodiments of the present system may be demonstrated as radio communication systems, it is possible that other forms of wireless communications may be used. It is understood that past and present standards may be used. It is also contemplated that future versions of these standards and new future standards may be employed without departing from the scope of the present subject matter.

The wireless communications support a connection from other devices, Such connections include, but are not limited to, one or more mono or stereo connections or digital connections having link protocols including, but not limited to 802.3 (Ethernet), 802.4, 802.5, USB, ATM, Fibre-channel, Firewire or 1394, InfiniBand, or a native streaming interface. In various embodiments, such connections include all past and present link protocols. It is also contemplated that future versions of these protocols and new protocols may be employed without departing from the scope of the present subject matter.

In various embodiments, the present subject matter is used in hearing assistance devices that are configured to communicate with mobile phones. In such embodiments, the hearing assistance device may be operable to perform one or more of the following: answer incoming calls, hang up on calls, and/or provide two way telephone communications. In various embodiments, the present subject matter is used in hearing assistance devices configured to communicate with packet-based devices. In various embodiments, the present subject matter includes hearing assistance devices configured to communicate with streaming audio devices. In various embodiments, the present subject matter includes hearing assistance devices configured to communicate with Wi-Fi devices. In various embodiments, the present subject matter includes hearing assistance devices capable of being controlled by remote control devices.

It is further understood that different hearing assistance devices may embody the present subject matter without departing from the scope of the present disclosure. The devices depicted in the figures are intended to demonstrate the subject matter, but not necessarily in a limited, exhaustive, or exclusive sense. It is also understood that the present subject matter may be used with a device designed for use in the right ear or the left ear or both ears of the wearer.

The present subject matter may be employed in hearing assistance devices, such as headsets, headphones, and similar hearing devices.

The present subject matter is demonstrated for hearing assistance devices, including hearing assistance devices, including but not limited to, behind-the-ear (BTE), in-the-ear (ITE), in-the-canal (ITC), receiver-in-canal (RIC), or completely-in-the-canal (CIC) type hearing assistance devices. It is understood that behind-the-ear type hearing assistance devices may include devices that reside substantially behind the ear or over the ear. Such devices may include hearing assistance devices with receivers associated with the electronics portion of the behind-the-ear device, or hearing assistance devices of the type having receivers in the ear canal of the user, including but not limited to receiver-in-canal (RIC) or receiver-in-the-ear (RITE) designs. The present subject matter may also be used in hearing assistance devices generally, such as cochlear implant type hearing devices and such as deep insertion devices having a transducer, such as a receiver or microphone, whether custom fitted, standard fitted, open fitted and/or occlusive fitted. It is understood that other hearing assistance devices not expressly stated herein may be used in conjunction with the present subject matter.

Each of the following non-limiting examples may stand on its own, or may be combined in various permutations or combinations with one or more of the other examples.

Example 1 is a method comprising: receiving an image of anatomy of a patient including at least a portion of a canal aperture of an ear of the patient; generating a patient model of a portion of the anatomy of the patient, the patient model indicating at least one of a height or width of the canal aperture; using the patient model, determining a best fit model from a set of hearing assistance device shell models generated using a machine learning technique; outputting an identification of the best fit model.

In Example 2, the subject matter of Example 1 includes, wherein the patient model further indicates at least one of a height or width of a concha bowl of the ear of the patient.

In Example 3, the subject matter of Examples 1-2 includes, wherein the image of the anatomy includes an image of a mold taken of the anatomy of the patient.

In Example 4, the subject matter of Examples 1-3 includes, wherein the image of the anatomy includes two orthogonal images generated by a mobile device.

In Example 5, the subject matter of Examples 1-4 includes, wherein the set of hearing assistance device shell models are generated by: clustering a plurality of feature vectors corresponding to a plurality of three-dimensional input models to generate a set of clusters; estimating a mean shell shape of each of the set of clusters.

In Example 6, the subject matter of Example 5 includes, wherein the plurality of feature vectors are generated by: aligning the plurality of three-dimensional input models to a template; and extracting features of each of the aligned plurality of three-dimensional input models to generate the plurality of feature vectors corresponding to the aligned plurality of three-dimensional input models.

In Example 7, the subject matter of Example 6 includes, wherein aligning the plurality of three-dimensional input models to the template includes determining correspondence between respective points in a model of the plurality of three-dimensional input models and points in the template.

In Example 8, the subject matter of Examples 6-7 includes, wherein extracting features of each of the aligned plurality of input models includes converting the plurality of three-dimensional input models into voxels.

In Example 9, the subject matter of Examples 5-8 includes, wherein clustering the plurality of feature vectors includes using at least one of: k-means clustering, density-based clustering, spectral clustering, or modeling with Gaussian mixtures.

In Example 10, the subject matter of Examples 5-9 includes, wherein the set of hearing assistance device shell models are output after inverting the respective mean shell shapes of each of the set of clusters by solving a minimization problem.

Example 11 is a system comprising: one or more processors coupled to a memory device, the memory device containing instructions which, when executed by the one or more processors, cause the system to: receive an image of anatomy of a patient including at least a portion of a canal aperture of an ear of the patient; generate a patient model of a portion of the anatomy of the patient, the patient model indicating at least one of a height or width of the canal aperture; determine, using the patient model, a best fit model from a set of hearing assistance device shell models generated using a machine learning technique; output an identification of the best fit model.

In Example 12, the subject matter of Example 11 includes, wherein the patient model further indicates at least one of a height or width of a concha bowl of the ear of the patient.

In Example 13, the subject matter of Examples 11-12 includes, wherein the image of the anatomy includes an image of a mold taken of a patient.

In Example 14, the subject matter of Examples 11-13 includes, wherein the image of the anatomy includes two orthogonal images generated by a mobile device.

In Example 15, the subject matter of Examples 11-14 includes, wherein the set of hearing assistance device shell models are generated by: clustering a plurality of feature vectors corresponding to a plurality of three-dimensional input models to generate a set of clusters; estimating a mean shell shape of each of the set of clusters; and outputting the set of hearing assistance device shell models corresponding to respective mean shell shapes of the set of clusters.

In Example 16, the subject matter of Example 15 includes, wherein the plurality of feature vectors are generated by: aligning the plurality of three-dimensional input models to a template; and extracting features of each of the aligned plurality of three-dimensional input models to generate the plurality of feature vectors corresponding to the aligned plurality of three-dimensional input models.

In Example 17, the subject matter of Example 16 includes, wherein the plurality of three-dimensional input models are aligned to the template by determining correspondence between respective points in a model of the plurality of three-dimensional input models and points in the template.

In Example 18, the subject matter of Examples 16-17 includes, wherein the features of each of the aligned plurality of input models are extracting by converting the plurality of three-dimensional input models into voxels.

In Example 19, the subject matter of Examples 15-18 includes, wherein the plurality of feature vectors are clustered using at least one of: k-means clustering, density-based clustering, spectral clustering, or modeling with Gaussian mixtures.

In Example 20, the subject matter of Examples 15-19 includes, wherein the set of hearing assistance device shell models are output after inverting the respective mean shell shapes of each of the set of clusters by solving a minimization problem.

Example 21 is a system comprising: one or more processors coupled to a memory device, the memory device containing instructions which, when executed by the one or more processors, cause the system to: align a plurality of three-dimensional input models to a template; extract features of each of the aligned plurality of three-dimensional input models to generate a plurality of feature vectors corresponding to the aligned plurality of three-dimensional input models; cluster the plurality of feature vectors to generate a set of clusters; estimate a mean shell shape of each of the set of clusters; and output a set of three-dimensional shell models corresponding to the set of clusters using a respective mean shell shape of each of the set of clusters.

In Example 22, the subject matter of Example 21 includes, wherein the plurality of three-dimensional input models are generated from images based on patient anatomy.

In Example 23, the subject matter of Example 22 includes, wherein the images include two orthogonal images generated by a mobile device.

In Example 24, the subject matter of Examples 22-23 includes, wherein the images are generated from silicone molds of patient anatomy.

In Example 25, the subject matter of Examples 21-24 includes, wherein to align the plurality of three-dimensional input models to the template, the instructions further cause the system to determine correspondence between respective points in a model of the plurality of three-dimensional input models and points in the template.

In Example 26, the subject matter of Examples 21-25 includes, wherein to align the plurality of three-dimensional input models to the template, the instructions further cause the system to iteratively align the plurality of three-dimensional input models to the template using an expectation-maximization algorithm.

In Example 27, the subject matter of Examples 21-26 includes, wherein to extract features of each of the aligned plurality of input models, the instructions further cause the system to convert the plurality of three-dimensional input models into voxels.

In Example 28, the subject matter of Example 27 includes, wherein the feature vectors are generated using a three-dimensional Discrete Fourier Transform applied to the voxels.

In Example 29, the subject matter of Examples 21-28 includes, wherein to cluster the plurality of feature vectors, the instructions further cause the system to use at least one of: k-means clustering, density-based clustering, spectral clustering, or modeling with Gaussian mixtures.

In Example 30, the subject matter of Examples 21-29 includes, wherein the instructions further cause the system to invert the respective mean shell shapes of each of the set of clusters by solving a minimization problem to generate the set of three-dimensional shell models.

Example 31 is a method comprising: aligning a plurality of three-dimensional input models to a template; extracting features of each of the aligned plurality of three-dimensional input models to generate a plurality of feature vectors corresponding to the aligned plurality of three-dimensional input models; clustering the plurality of feature vectors to generate a set of clusters; estimating a mean shell shape of each of the set of clusters; and outputting a set of three-dimensional shell models corresponding to the set of clusters using a respective mean shell shape of each of the set of clusters.

In Example 32, the subject matter of Example 31 includes, wherein the plurality of three-dimensional input models are generated from images based on patient anatomy.

In Example 33, the subject matter of Example 32 includes, wherein the images include two orthogonal images generated by a mobile device.

In Example 34, the subject matter of Examples 32-33 includes, wherein the images are generated from silicone molds of patient anatomy.

In Example 35, the subject matter of Examples 31-34 includes, wherein aligning the plurality of three-dimensional input models to the template includes determining correspondence between respective points in a model of the plurality of three-dimensional input models and points in the template.

In Example 36, the subject matter of Examples 31-35 includes, wherein aligning the plurality of three-dimensional input models to the template includes iteratively aligning the plurality of three-dimensional input models to the template using an expectation-maximization algorithm.

In Example 37, the subject matter of Examples 31-36 includes, wherein extracting features of each of the aligned plurality of input models includes converting the plurality of three-dimensional input models into voxels.

In Example 38, the subject matter of Example 37 includes, wherein the feature vectors are generated using a three-dimensional Discrete Fourier Transform applied to the voxels.

In Example 39, the subject matter of Examples 31-38 includes, wherein clustering the plurality of feature vectors includes using at least one of: k-means clustering, density-based clustering, spectral clustering, or modeling with Gaussian mixtures.

In Example 40, the subject matter of Examples 31-39 includes, inverting the respective mean shell shapes of each of the set of clusters by solving a minimization problem to generate the set of three-dimensional shell models.

Example 41 is at least one machine-readable medium including instructions that, when executed by processing circuitry, cause the processing circuitry to perform operations to implement of any of Examples 1-40.

Example 42 is an apparatus comprising means to implement of any of Examples 1-40.

Example 43 is a system to implement of any of Examples 1-40.

Example 44 is a method to implement of any of Examples 1-40,

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or nonvolatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. A system comprising:

one or more processors coupled to a memory device, the memory device containing instructions which, when executed by the one or more processors, cause the system to:

align a plurality of 3D input models to a template;

extract features of each of the aligned plurality of 3D input models to generate a plurality of feature vectors corresponding to the aligned plurality of 3D input models;

cluster the plurality of feature vectors to generate a set of clusters;

estimate a mean shell shape of each of the set of clusters; and output a set of 3D shell models corresponding to the set of clusters using a respective mean shell shape of each of the set of clusters.

2. The system of claim 1, wherein the plurality of 3D input models are generated from images based on patient anatomy.

3. The system of claim 2, wherein the images include two orthogonal images generated by a mobile device.

4. The system of claim 2, wherein the images are generated from silicone molds of patient anatomy.

5. The system of claim 1, wherein to align the plurality of 3D input models to the template, the instructions further cause the system to determine correspondence between respective points in a model of the plurality of 3D input models and points in the template.

6. The system of claim 1, wherein to align the plurality of 3D input models to the template, the instructions further cause the system to iteratively align the plurality of 3D input models to the template using an expectation-maximization algorithm.

7. The system of claim 1, wherein to extract features of each of the aligned plurality of input models, the instructions further cause the system to convert the plurality of 3D input models into voxels.

8. The system of claim 7, wherein the feature vectors are generated using a 3D Discrete Fourier Transform applied to the voxels.

9. The system of claim 1, wherein to cluster the plurality of feature vectors, the instructions further cause the system to use at least one of: k-means clustering, density-based clustering, spectral clustering, or modeling with Gaussian mixtures.

10. The system of claim 1, wherein the instructions further cause the system to invert the respective mean shell shapes of each of the set of clusters by solving a minimization problem to generate the set of 3D shell models.

11. A method comprising:

aligning a plurality of 3D input models to a template;

extracting features of each of the aligned plurality of 3D input models to generate a plurality of feature vectors corresponding to the aligned plurality of 3D input models;

clustering the plurality of feature vectors to generate a set of clusters;

estimating a mean shell shape of each of the set of clusters; and outputting a set of 3D shell models corresponding to the set of clusters using a respective mean shell shape of each of the set of clusters.

12. The method of claim 11, wherein the plurality of 3D input models are generated from images based on patient anatomy.

13. The method of claim 12, wherein the images include two orthogonal images generated by a mobile device.

14. The method of claim 12, wherein the images are generated from silicone molds of patient anatomy.

15. The method of claim 11, wherein aligning the plurality of 3D input models to the template includes determining correspondence between respective points in a model of the plurality of 3D input models and points in the template.

16. The method of claim 11, wherein aligning the plurality of 3D input models to the template includes iteratively aligning the plurality of 3D input models to the template using an expectation-maximization algorithm.

17. The method of claim 11, wherein extracting features of each of the aligned plurality of input models includes converting the plurality of 3D input models into voxels.

18. The method of claim 17, wherein the feature vectors are generated using a 3D Discrete Fourier Transform applied to the voxels.

19. The method of claim 11, wherein clustering the plurality of feature vectors includes using at least one of: k-means clustering, density-based clustering, spectral clustering, or modeling with Gaussian mixtures.

20. The method of claim 11, further comprising inverting the respective mean shell shapes of each of the set of clusters by solving a minimization problem to generate the set of 3D shell models.

* * * * *